Jan. 26, 1937.  R. S. HINSEY  2,068,746
APPARATUS FOR CASE HARDENING GLASS
Filed May 4, 1935  4 Sheets-Sheet 4
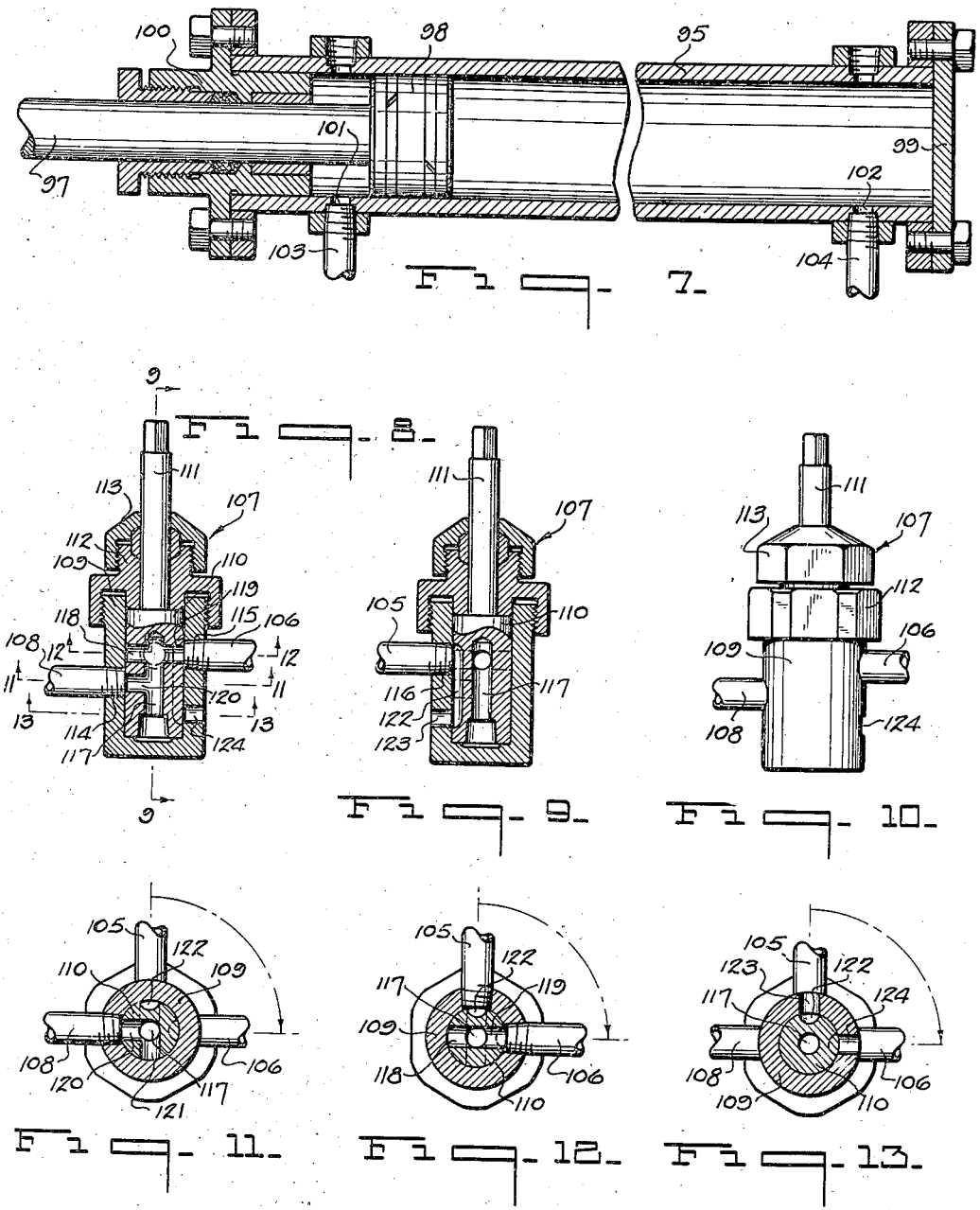
Inventor
ROBERT S. HINSEY.
By
Frank Fraser
Attorney Patented Jan. 26, 1937

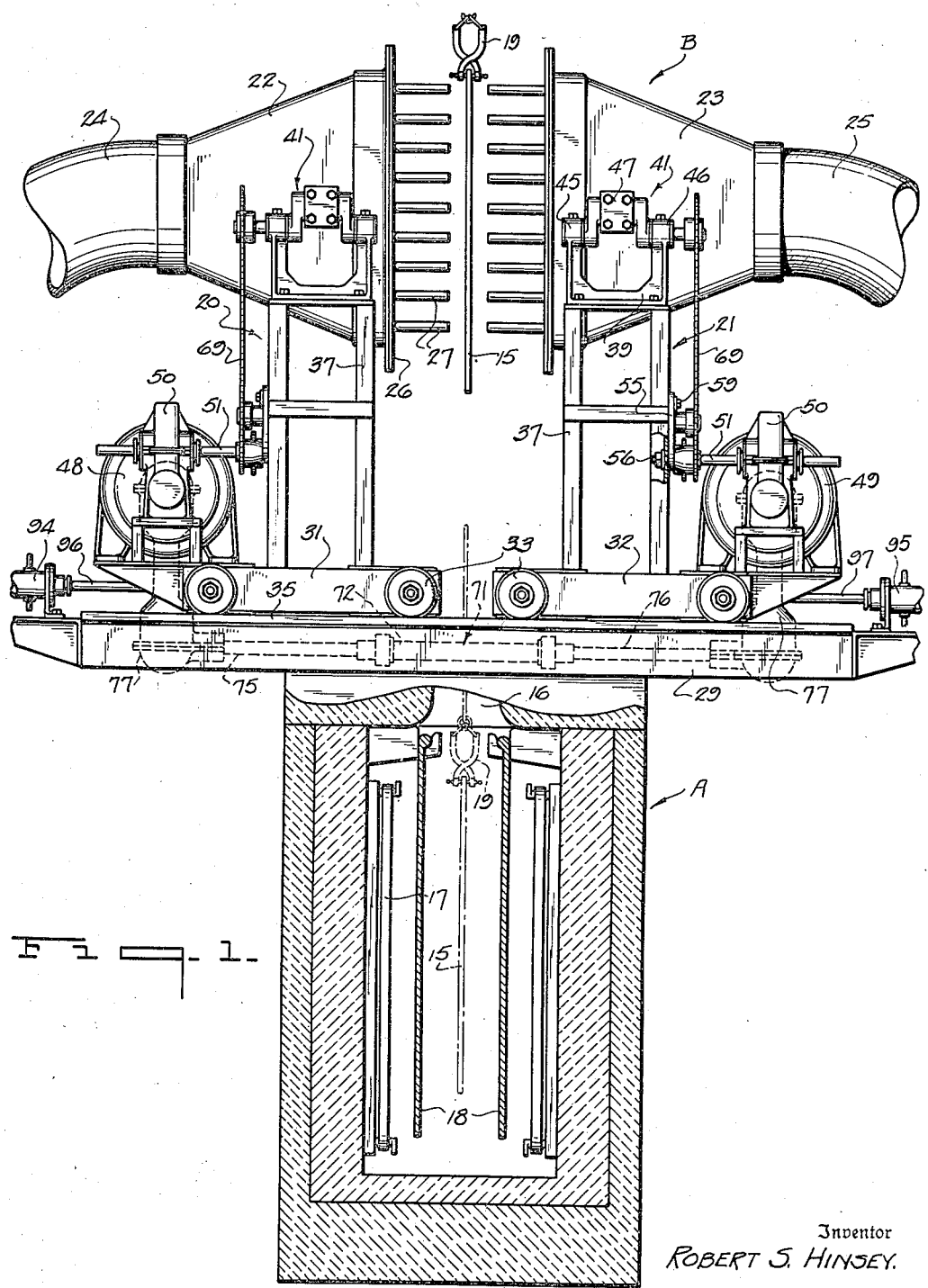

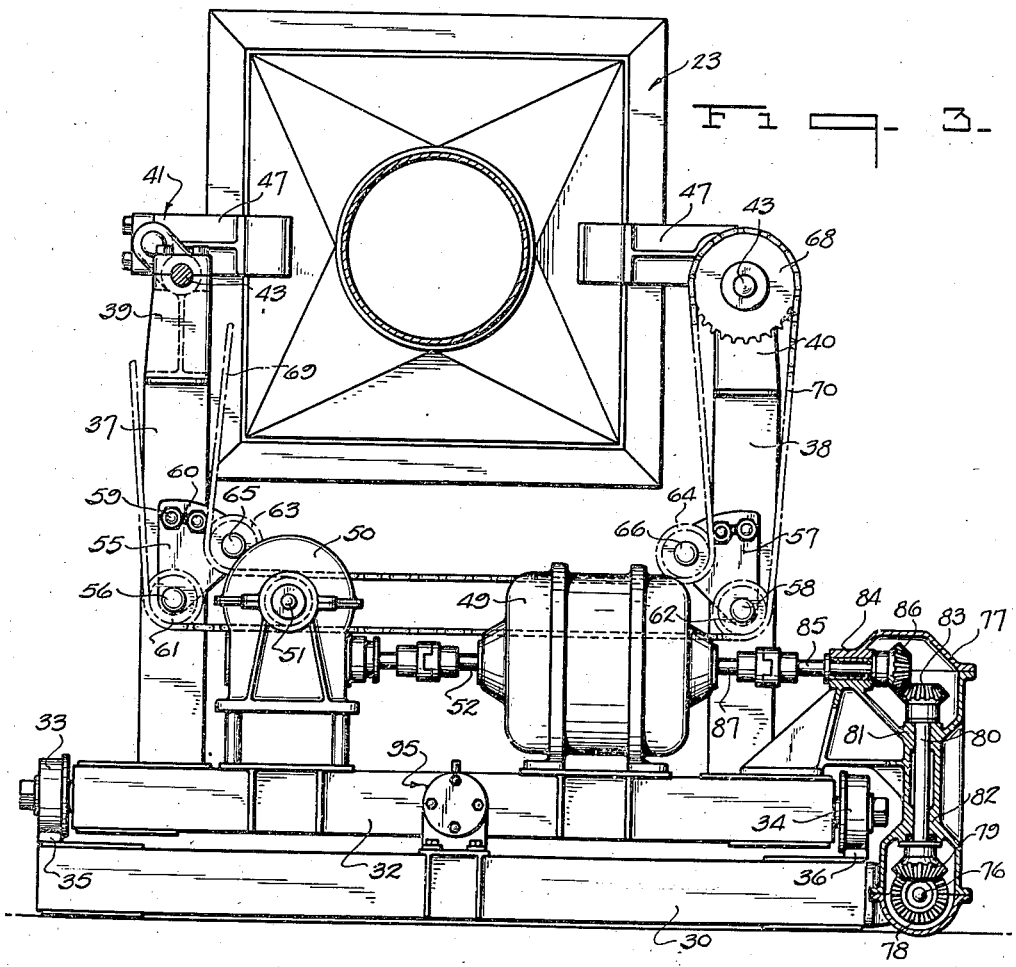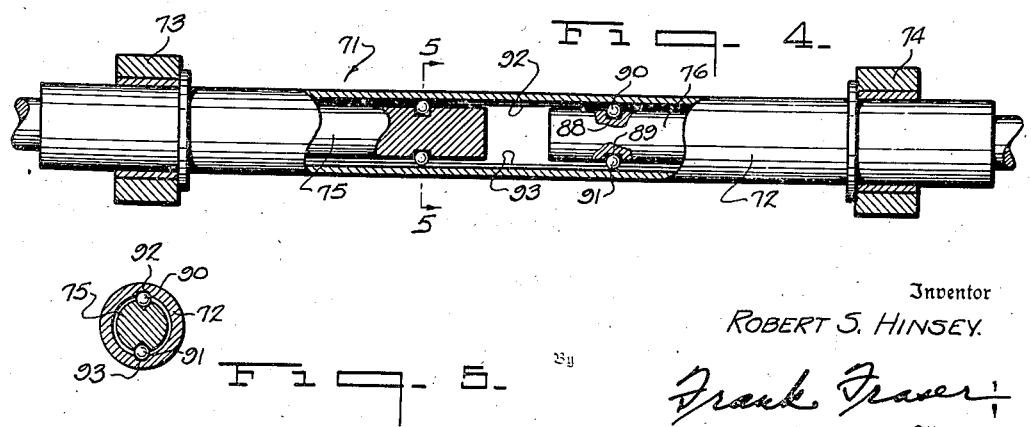

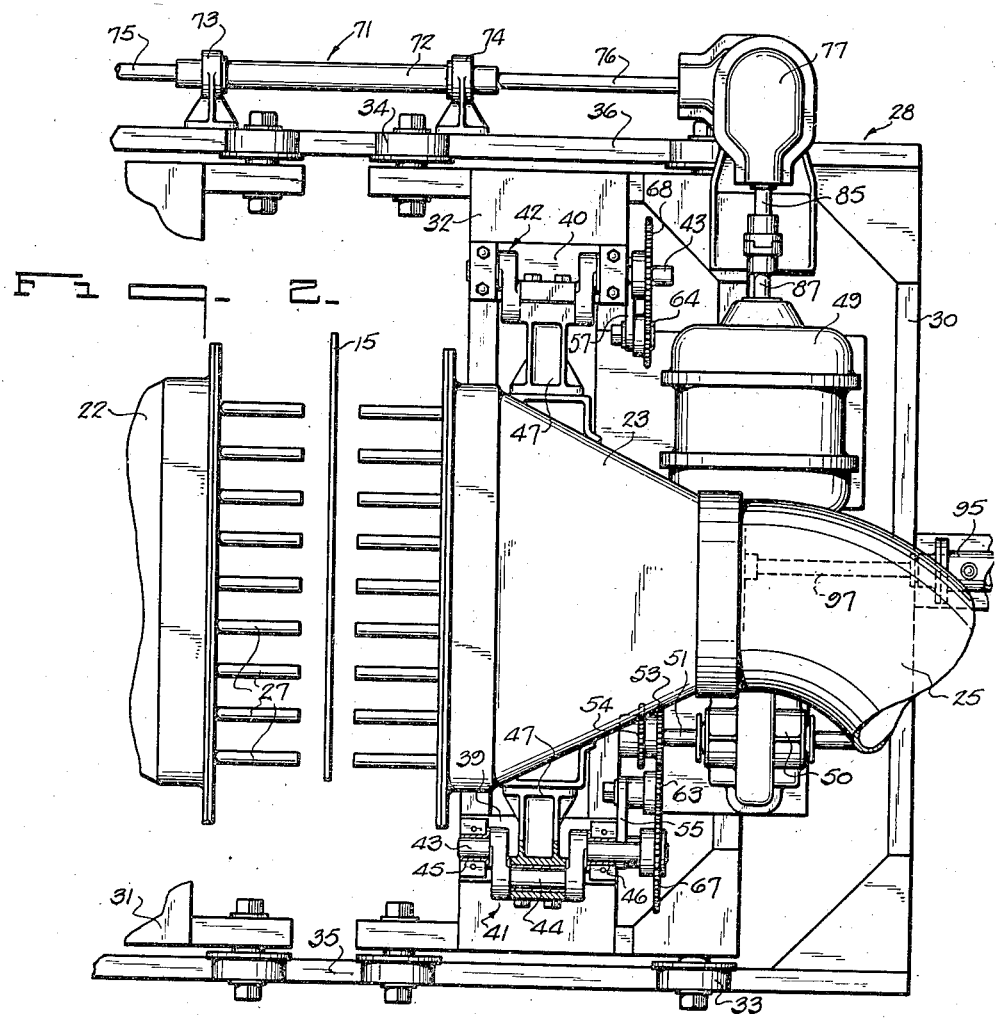
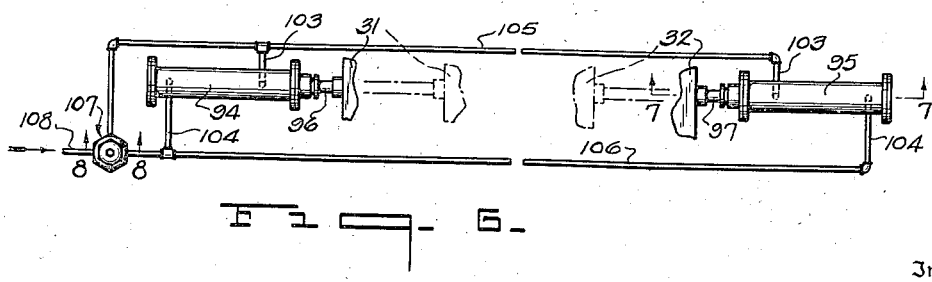

2,068,746

UNITED STATES PATENT OFFICE 2,068,746

APPARATUS FOR CASE HARDENING GLASS

Robert S. Hinsey, Toledo, Ohio, assignor to Libbey-Owens-Ford Glass Company, Toledo, Ohio, a corporation of Ohio Application May 4, 1935, Serial No. 19,783

12 Claims. (Cl. 49—45)

The present invention relates to improvements in apparatus for use in the case hardening of glass sheets or plates.

When case hardening glass sheets according to one well known process, the sheets are first heated to approximately the point of softening of the glass and then suddenly chilled to place the outer surfaces of said sheets under compression and the interiors thereof under tension. The treatment of glass sheets in this manner not only materially increases the mechanical strength of the glass but further modifies its breaking characteristics in that when broken the glass sheet will disintegrate into innumerable small and relatively harmless particles instead of breaking into large dangerous pieces or slivers as is the case with ordinary glass.

In the practice of the above process, the glass sheet is ordinarily maintained in a vertical position during the treatment thereof and it is customary to suspend the sheet from a plurality of relatively small tongs or hooks which engage the same near its upper edge. The glass sheet is first heated to the desired temperature within a suitable furnace and upon removal therefrom is subjected immediately to the action of suitable cooling means by which the glass is suddenly chilled. The cooling means usually employed includes spaced cooling units provided with blower heads between which the highly heated glass sheet is received, said blower heads serving to direct jets of air upon opposite faces of the sheet simultaneously. These blower heads are preferably mounted for oscillatory movement in the plane of the glass sheet to effect a more uniform distribution of the air over the surfaces thereof and in consequence a more uniform cooling of the glass.

This invention concerns broadly the improvement of the cooling means and has for one of its important objects the provision of novel means for mounting the cooling units and for oscillating the blower heads thereof.

Another important object of the invention resides in the provision of means for synchronizing the oscillating movement of the blower heads to insure a more even and uniform treatment of opposite surfaces of the glass sheet.

Another important object of the invention is the provision of means for moving the cooling units simultaneously toward and away from one another whereby to effect the application of equal pressures upon opposite surfaces of the glass sheet.

A further object of the invention is the provision of an independent drive means for effecting the oscillating movement of each blower head together with connections between said drive means for synchronizing the operation thereof while at the same time permitting movement of the blower heads toward and away from one another.

Other objects and advantages of the invention will become more apparent during the course of the following description when taken in connection with the accompanying drawings.

In the drawings wherein like numerals are employed to designate like parts throughout the same, Fig. 1 is a side elevation of case hardening apparatus constructed in accordance with the present invention, the furnace for heating the glass sheets being shown in section, Fig. 2 is a plan view of a portion of the cooling means, Fig. 3 is an end view of one of the cooling units, Fig. 4 is a view, partially in section, of the slip connection between the individual means for oscillating the blower heads of the spaced cooling units, Fig. 5 is a detail section taken substantially on line 5—5 of Fig. 4, Fig. 6 is a somewhat diagrammatic view of the means for moving the cooling units simultaneously toward and away from one another, Fig. 7 is a longitudinal section through one of the air cylinders taken substantially on line 7—7 of Fig. 6, Fig. 8 is a vertical section through the control valve taken substantially on line 8—8 of Fig. 6, Fig. 9 is a section taken substantially on line 9—9 of Fig. 8, Fig. 10 is an elevation of the control valve, and Figs. 11, 12 and 13 are transverse sections taken respectively on lines 11—11, 12—12, and 13—13 of Fig. 8.

As brought out above, in the practice of one well known process for hardening glass sheets, the sheets are first heated to approximately the point of softening of the glass and then suddenly chilled to place the outer surfaces of the sheets under compression and the interiors thereof under tension.

In the embodiment illustrated in the drawings, the means for heating the glass sheets comprises a furnace designated in its entirety by the letter A, while the means for subsequently cooling or chilling the sheets is designated generally by the letter B. The cooling means B is preferably arranged directly above the furnace A so that the glass sheet 15, after being heated within the furnace, can be transferred directly to the cooling means without any undue loss of heat and without being adversely affected by atmospheric conditions during the transfer.

The furnace A is preferably of the electrically heated type and is provided with a top opening 16 through which the glass sheet 15 to be treated may be inserted and removed. Any suitable covering can be used for the opening 16 as will be readily understood. For the purpose of heating the furnace, electrical heating elements 17 may be used in conjunction with baffle plates 18, and by means of any conventional indicating and control mechanism the temperature of the furnace can be regulated to heat the glass sheet 15 to approximately its point of softening which is ordinarily in the neighborhood of 1250 degrees Fahrenheit for flat glass. The glass sheet can be suspended within the furnace from a plurality of relatively small tongs 19 engaging said sheet near its upper edge.

When the glass sheet has been heated to the desired temperature within the furnace, it is lifted therefrom through the top opening 16 and subjected immediately to the action of the cooling means B which consists of the spaced cooling units 20 and 21. The two cooling units 20 and 21 include oppositely disposed blower heads 22 and 23 respectively connected by flexible conduits 24 and 25 to suitable blowers (not shown) so that blasts of air can be directed simultaneously upon opposite surfaces of the glass sheet 15 when it is brought into position between the said blower heads. The inner end of each blower head may be closed by a plate 26 provided with a plurality of nipples 27 through which jets of air are directed against the sheet.

The cooling units 20 and 21 are supported upon a substantially rectangular horizontal frame 28 including spaced longitudinally extending side members 29 and transverse end members 30. The blower heads 22 and 23 of the units 20 and 21 are mounted upon carriages 31 and 32 respectively extending transversely of the supporting frame 28 and each being provided at its opposite end with wheels 33 and 34 which run along rails 35 and 36 carried upon the tops of the side members 29 of the said frame 28.

Rising from each of the carriages 31 and 32, adjacent the opposite ends thereof, are standards 37 and 38 carrying at their upper ends the substantially U-shaped bearing brackets 39 and 40 respectively. Associated with the brackets 39 and 40 are rotatable cranks 41 and 42 respectively, each including a horizontal crank shaft 43 and a crank pin 44, said crank shaft being journaled at its opposite ends in bearings 45 and 46 formed at the upper ends of the respective bracket 39 or 40, while rotatably mounted upon the crank pin 44 is a support 47 secured to the respective blower head 22 or 23. The supports 47 carried by cranks 41 and 42 are secured to the respective blower head at oppositely disposed points so that upon rotation of the said cranks the said blower head will be oscillated in the plane of the glass sheet 15. As pointed out above, the oscillation of the blower heads results in a more even distribution of the air over the faces of the glass sheet.

It has also been found, however, that in order to obtain a satisfactory and constant predetermined type of break, it is essential that the jets of air from opposed blower heads impinge upon the two faces of the glass sheet at directly opposite points since if this is not done, the two faces of the sheet will not receive the same treatment. This invention, therefore, contemplates the provision of means for synchronizing the oscillating movement of the blower heads to insure that the opposite faces of the glass sheet will undergo the same cooling action.

In the embodiment illustrated, the means for oscillating the blower heads 22 and 23 includes the two motors 48 and 49 respectively mounted upon the carriages 31 and 32. Also mounted upon each carriage 31 and 32 is a housing 50 in which is journaled a horizontal transverse shaft 51 driven from the shaft 52 of the respective motor 48 or 49 through suitable shafting and reduction gearing contained in said housing. The transverse shaft 51 projects beyond the housing 50 and has keyed to the inner end thereof the sprockets 53 and 54 (Fig. 2).

Carried by the standard 37 of each cooling unit is a substantially triangular plate 55 pivotally mounted upon a pin 56, while a similar plate 57 is pivoted to the standard 38 upon a pin 58 directly opposite plate 55. Each of these plates 55 and 57 may be secured in desired adjusted position by bolts 59 operating within an arcuate slot 60 adjacent the upper end thereof.

Loosely mounted upon the pins 56 and 58 are sprockets 61 and 62 respectively, while also rotatably carried by the plates 55 and 57, adjacent the upper inner ends thereof, are sprockets 63 and 64 mounted upon pins 65 and 66. The sprocket 53 on transverse shaft 51 is positioned in alignment with sprockets 61 and 63 associated with the plate 55, while the sprocket 54 on shaft 51 is in alignment with sprockets 62 and 64 associated with plate 57. Also keyed to the crank shafts 43 of the cranks 41 and 42 are sprockets 67 and 68 respectively.

The numerals 69 and 70 designate two sprocket chains through which power is transmitted from the drive motor to the crank shafts 41 and 42 of each cooling unit. The sprocket chain 69 is trained about the sprockets 53, 61, 63 and 67 to drive the crank 41, while the sprocket chain 70 is trained about the sprockets 54, 62, 64, and 68 to drive the crank 42. Upon operation of the motor, therefore, to drive shaft 51, it will be seen that rotary movement will be imparted simultaneously to the cranks 41 and 42 to cause the desired oscillation of the blower head.

The plates 55 and 57 and sprockets 63 and 64 carried thereby act as chain tighteners in that upon swinging of these plates about their pivots 56 and 58, the required tightness of the sprocket chains 69 and 70 may be achieved.

It will of course be appreciated that although the two motors 48 and 49 may be of the same size and rating, yet they will not always operate at exactly the same speed, with the result that any variation in the speed of one motor and not in the other would, under ordinary conditions, cause one of the blower heads to be oscillated either slightly faster or slower than the other blower head. With the apparatus herein provided, however, any variation in the speed of one motor will cause a corresponding variation in the speed of the other motor, and by synchronizing the two motors, the oscillatory movement of the blower heads will always be the same. To this end there is arranged between and operatively associated with the two motors 48 and 49 a slip connection, designated in its entirety by the numeral 71 and comprising a horizontal sleeve 72 supported at its opposite end in bearings 73 and 74 carried by the supporting frame 28. Received within the opposite ends of the sleeve 72 are shafts 75 and 76 driven from the motors 48 and 49 respectively. Thus, each shaft 75 and 76 is journaled at its outer end in a housing 77 carried by and movable with the respective carriage 31 or 32. Keyed to the shaft within said housing is a bevelled gear 78 meshing with a correspondingly bevelled gear 79 fixed to the lower end of a vertical shaft 80 journaled in spaced bearings 81 and 82 and carrying a bevelled gear 83 at its upper end. The housing 77 is also provided with a horizontal bearing 84 in which is journaled a shaft 85 having keyed thereto a bevelled gear 86 meshing with bevelled gear 83 and being driven from the shaft 87 of the respective motor 48 or 49.

Each of the shafts 76 and 77 is provided adjacent its inner end with oppositely disposed recesses 88 and 89 (Figs. 4 and 5) within which are partially received the ball bearings 90 and 91 respectively which operate in longitudinally extending keyways 92 and 93 formed in the sleeve 72. It will be readily apparent that with this construction, both a driving connection as well as a sliding connection are provided between the shafts 75 and 76. In other words, while these two shafts are driven as a unit, they can also slide freely within the sleeve 72 toward and away from one another upon inward and outward movement of the blower heads. The provision of the slip connection 71 will result in the two motors 48 and 49 being always driven at the same speed. Thus, should one of the motors start to run a little faster than the other motor, the speed of the second motor will be immediately increased accordingly, while, on the other hand, should one of the motors slow down, the connection will cause the speed of the other motor to be decreased an equal amount. By maintaining the speed of the two motors the same, the oscillatory movement of the blower heads will be synchronized, thereby assuring the same treatment of opposite surfaces of the glass sheet.

In the operation of the apparatus above described and during the cooling of the glass sheet 15, the nipples 27 of opposed blower heads are ordinarily spaced approximately five inches apart. During the lifting of the sheet from the furnace A, however, the blower heads are moved away from one another and as soon as the sheet is in position therebetween, they are again moved together. The air pressure is preferably turned on before the sheet is lifted from the furnace. Naturally, it is desirable that the same amount of pressure be applied to opposite faces of the sheet in order to effect equal cooling thereof. If this is to be done, however, it is necessary that the nipples 27 of opposite blower heads be spaced equal distances from the sheet, otherwise not only will the pressure upon opposite faces of the sheet be unequal, but as a result of this unequal pressure the sheet will be caused to swing to one side resulting in the buckling or distortion thereof. According to the present invention, therefore, means is provided for moving the cooling units simultaneously toward and away from one another so that the blower heads will at all times be spaced equal distances from the sheet.

The means for effecting movement of the blower heads toward and away from one another is illustrated in detail in Figs. 6 to 13 inclusive. With reference particularly to Figs. 6 and 7, there is mounted at opposite ends of the supporting frame 28 the horizontally disposed air cylinders 94 and 95 within which are slidably mounted the piston rods 96 and 97 connected at their outer ends to carriages 31 and 32 respectively while secured to the inner end of each rod is a piston 98. The outer end of each cylinder is closed by a plate 99, while the inner end is provided with a stuffing box 100 through which the piston rod operates. Each air cylinder is provided adjacent its opposite ends with lateral ports 101 and 102 within which are threaded or otherwise secured pipes 103 and 104 respectively, the pipes 103 from the two cylinders 94 and 95 being connected with a common conduit 105, while the pipes 104 are connected with a conduit 106, the said conduits 105 and 106 being in turn connected with a valve 107 which provides a common control means for effecting simultaneous inward and outward movement of the piston rods 96 and 97 and likewise of the blower heads. The air is supplied to the control valve 107 through a supply pipe 108.

When the pistons 98 are moved forwardly within the cylinders 94 and 95 to effect movement of the blower heads toward one another, air under pressure is introduced into the said cylinders through the conduit 106 and pipes 104, while the air within the cylinders in advance of the pistons is exhausted through pipes 103 and conduit 105. On the other hand, when it is desired to retract the pistons to effect movement of the blower heads away from one another, the air is introduced into the cylinders through the conduit 105 and pipes 103, while the air within the cylinders is exhausted through pipes 104 and conduit 106.

Referring particularly to Figs. 8 to 13, the control valve 107 comprises a cylindrical casing 109 within which is mounted a rotatable cylindrical plug 110 carried at the lower end of a vertical stem 111 and being secured in place by a cap 112 screwed upon said casing and upon which cap is threaded a nut 113. The casing 109 is provided with three ports 114, 115, and 116, with which are associated the inlet pipe 108 and the conduits 106 and 105 respectively.

The plug 110 is formed with a vertical passage 117 from which extend the four lateral ducts 118, 119, 120 and 121, the ducts 118 and 119 being in alignment with one another, as shown in Figs. 8 and 12, while the ducts 120 and 121 are disposed beneath ducts 118 and 119 and are arranged at right angles relative to one another as best shown in Fig. 11. When the ducts 119 and 120 are open to the passage of air, the ducts 118 and 121 are closed by the wall of the casing, whereas when the two latter ducts are open, the ducts 119 and 120 are closed. The opening and closing of the two sets of ducts is effected by rotating the plug 110 ninety degrees.

When it is desired to move the blower heads 22 and 23 toward one another, the plug 110 is turned to the position shown in Figs. 8 to 13, whereupon the duct 120 will be brought into registry with the air supply pipe 108 and the duct 119 into registry with conduit 106, while the ducts 118 and 121 will be closed. The air then enters through the inlet pipe 108 and passes through duct 120, vertical passage 117, and duct 119 into and through the conduit 106 and pipes 104 into the cylinders 94 and 95 through the ports 102. The introduction of the air in this manner acting upon the outer ends of the pistons 98 will force the piston rods 96 and 97 forwardly, with the result that the carriages 31 and 32 will be moved simultaneously toward one another to bring the blower heads closer together.

Upon forward movement of the pistons, the air contained in the cylinders in advance of said pistons must of course be permitted to escape therefrom. To accomplish this, the plug 110 of the control valve is formed with a vertical longitudinal groove 122 (Fig. 9) and during the operation of the valve in the above manner, this groove will be brought into registry with the conduit 105 and also with an outlet opening 123 formed in the valve casing. The air in advance of the pistons can therefore escape through the pipes 103 and conduit 105 into the groove 122 and out through the opening 123.

When it is then desired to move the blower heads away from one another, the valve plug 110 is turned in a clockwise direction ninety degrees, as indicated by the arrows in Figs. 11, 12 and 13 and upon turning of the plug, the duct 118 will be brought into registry with the conduit 105, while the duct 121 will register with the supply pipe 108. Simultaneously, the ducts 119 and 120 will be closed. The air then entering through the pipe 108 and duct 121 will pass upwardly through passage 117 and out through the duct 118 into conduit 105 from which it passes through pipes 103 into the cylinders 94 and 95 in advance of the pistons, causing the said pistons to be forced rearwardly and thereby effecting movement of the blower heads simultaneously away from one another. When the plug 110 is thus positioned, the groove 122 will be brought into registry with the conduit 106 and also with a second outlet opening 124 in the casing 109 so that the air behind the pistons can escape through the pipes 104 and conduit 106, passing through the groove 122 and opening 124 to the atmosphere.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the case hardening of glass sheets wherein the sheet is first heated to substantially the softening point of the glass and then suddenly cooled, spaced cooling means for receiving the heated sheet therebetween, a motor for moving each of said cooling means in the plane of the glass sheet, and connections between said motors for synchronizing the speed thereof.

2. In apparatus for use in the case hardening of glass sheets wherein the sheet is first heated to substantially the softening point of the glass and then suddenly cooled, means for cooling the sheet including spaced blower heads for receiving the heated glass sheets therebetween, a motor for oscillating each of said blower heads in the plane of the glass sheet, and connections between said motors for synchronizing the speed thereof.

3. In apparatus for use in the case hardening of glass sheets wherein the sheet is first heated to substantially the softening point of the glass and then suddenly cooled, means for cooling the sheet including spaced blower heads for receiving the heated glass sheet therebetween, means for oscillating said blower heads in the plane of the glass sheet, means for synchronizing the oscillating movement of the blower heads, and means for moving the blower heads simultaneously toward and away from one another.

4. In apparatus for use in the case hardening of glass sheets wherein the sheet is first heated to substantially the softening point of the glass and then suddenly cooled, means for cooling the sheet including spaced blower heads for receiving the heated glass sheets therebetween, separate drive means for oscillating said blower heads in the plane of the glass sheet, means for synchronizing the operation of said drive means, and means for moving the blower heads simultaneously toward and away from one another.

5. In apparatus for use in the case hardening of glass sheets wherein the sheet is first heated to substantially the softening point of the glass and then suddenly cooled, means for cooling the sheet including spaced blower heads for receiving the heated glass sheets therebetween, a motor for oscillating each of said blower heads in the plane of the glass sheet, connections between said motors for synchronizing the speed thereof, and means for moving the blower heads simultaneously toward and away from one another.

6. In apparatus for use in the case hardening of glass sheets wherein the sheet is first heated to substantially the softening point of the glass and then suddenly cooled, means for cooling the sheet including spaced blower heads for receiving the heated glass sheet therebetween, means for moving said blower heads in the plane of the glass sheet including a motor for each blower head, and a slip connection between and operatively connecting said motors for synchronizing the speed thereof.

7. In apparatus for use in the case hardening of glass sheets wherein the sheet is first heated to substantially the softening point of the glass and then suddenly cooled, means for cooling the sheet including spaced blower heads for receiving the heated glass sheet therebetween, means for moving said blower heads in the plane of the glass sheet including a motor for each blower head, a slip connection between said motors for synchronizing the speed thereof, said slip connection including a sleeve, shafts slidably keyed within said sleeve, and drive connections between said shafts and motors.

8. In apparatus for use in the case hardening of glass sheets wherein the sheet is first heated to substantially the softening point of the glass and then suddenly cooled, means for cooling the sheet including spaced blower heads for receiving the heated glass sheet therebetween, means for moving said blower heads in the plane of the glass sheet including a motor for each blower head, a slip connection between and operatively connecting said motors for synchronizing the speed thereof, and means for moving the blower heads simultaneously toward and away from one another.

9. In apparatus for use in the case hardening of glass sheets wherein the sheet is first heated to substantially the softening point of the glass and then suddenly cooled, means for cooling the sheet including spaced blower heads for receiving the heated glass sheet therebetween, means for moving said blower heads in the plane of the glass sheet including a motor for each blower head, a slip connection between said motors for synchronizing the speed thereof, said slip connection including a sleeve, shafts slidably keyed within said sleeve, drive connections between said shafts and motors, and means for moving the blower heads simultaneously toward and away from one another.

10. In apparatus for use in the case hardening of glass sheets wherein the sheet is first heated to substantially the softening point of the glass and then suddenly cooled, means for cooling the sheet including spaced blower heads for receiving the heated glass sheet therebetween, and means for moving said blower heads simultaneously toward and away from one another.

11. In apparatus for use in the case hardening of glass sheets wherein the sheet is first heated to substantially the softening point of the glass and then suddenly cooled, means for cooling the sheet including spaced blower heads for receiving the heated glass sheet therebetween, and air actuated means for moving said blower heads simultaneously toward and away from one another.

12. In apparatus for use in the case hardening of glass sheets wherein the sheet is first heated to substantially the softening point of the glass and then suddenly cooled, means for cooling the glass sheet including spaced cooling units for receiving the heated sheet therebetween and means for moving said cooling units simultaneously toward and away from one another including an air cylinder associated with each unit, a piston operating within each cylinder and connected with the respective cooling unit, a common control valve, and connections between said valve and cylinders for simultaneously actuating the pistons.

ROBERT S. HINSEY.